(12) United States Patent
Minamoto et al.

(10) Patent No.: US 7,172,361 B2
(45) Date of Patent: Feb. 6, 2007

(54) EXTENDABLE SHAFT

(75) Inventors: Noboru Minamoto, Okazaki (JP); Ryouichi Tokioka, Yamatokohriyama (JP); Shuzo Hirakushi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 177 days.

(21) Appl. No.: 10/895,403

(22) Filed: Jul. 21, 2004

(65) Prior Publication Data
US 2005/0044980 A1   Mar. 3, 2005

(30) Foreign Application Priority Data
Jul. 23, 2003   (JP)  ............... 2003-200689

(51) Int. Cl.
*B25G 3/28* (2006.01)
(52) U.S. Cl. .................. 403/359.5; 464/182
(58) Field of Classification Search ............ 403/359.1, 403/359.5, 359.6; 464/162, 182, 903; 74/492, 74/493
See application file for complete search history.

(56) References Cited

U.S. PATENT DOCUMENTS

| | | | |
|---|---|---|---|
| 2,218,841 A * | 10/1940 | Bluemel | .............. 74/493 |
| 4,619,548 A | 10/1986 | Kazaoka et al. | |
| 5,006,007 A * | 4/1991 | Fischer et al. | ....... 403/359.5 X |
| 5,816,113 A * | 10/1998 | Fohl | ............ 403/359.5 X |
| 6,189,405 B1 * | 2/2001 | Yazane | .............. 74/493 |
| 6,267,528 B1 | 7/2001 | Higashino | |
| 6,428,236 B2 * | 8/2002 | Aota et al. | ............... 403/359.5 |

FOREIGN PATENT DOCUMENTS

| | | |
|---|---|---|
| EP | 0 220 986 | 5/1987 |
| EP | 1 106 847 | 6/2001 |
| JP | 62-106127 | 5/1987 |
| JP | 63-17862 | 5/1988 |

* cited by examiner

*Primary Examiner*—Greg Binda
(74) *Attorney, Agent, or Firm*—Rabin & Berdo, P.C.

(57) ABSTRACT

An extendable shaft includes a first and a second shaft sections aligned on the same axis. External splines on an outer periphery of the first shaft section engage external splines on an inner periphery of the second shaft section. The first shaft section includes a slit extended from an opening end thereof for a predetermined length along an axial direction. A diametrically contractible portion adapted for elastic reduction in diameter is provided in a region ranging from the opening end of the first shaft section to place away therefrom by the predetermined length along the axial direction. A thin-wall portion is formed in a part of the diametrically contractible portion. A clamping member elastically clamps the diametrically contractible portion.

15 Claims, 10 Drawing Sheets

EXTENDABLE SHAFT

BACKGROUND OF THE INVENTION

1. Field of the Invention

The present invention relates to an extendable shaft for use, for example, in steering assembly for vehicles.

2. Description of Related Art

An extendable shaft includes a type which includes a first tubular shaft section and a second shaft section inserted and fitted in the first tubular shaft section. The first and the second shaft sections are engaged with each other via spline fit so as to be slidably movable relative to each other.

Some of the conventional extendable shafts have a play elimination function for obviating the occurrence of play at a spline fit portion. Specifically, the aforesaid first shaft section is formed with a plurality of slits at an end thereof, and the slits are opening toward an opening end and extending for a predetermined length along an axial direction. This involves the formation of a plurality of cantilevered tongues, elastically deformable, between the slits.

In order to prevent the occurrence of play at the spline fit portion, a clamping member for elastically clamping the aforesaid tongues is fitted on an outer periphery of the plural tongues. A clamping force of the clamping member elastically deforms the tongues, thereby reducing the diameter of the end of the first shaft section (see, for example, FIG. 1 of Japanese Utility Model Publication No.63-17862, FIG. 2 of Japanese Unexamined Patent Publication No.62-106127).

As long term changes become heavier, the wear of spline teeth increases. If the tongues are elastically yielded in an insufficient amount relative to the amount of wear, play occurs at the spline fit portion.

Hence, it may be contemplated to increase the clamping force of the clamping member. However, the increase of the clamping force results in an increase of slide resistance at the spline fit portion between the first and the second shaft sections.

It is an object of the present invention to provide an extendable shaft adapted for the reduction of the slide resistance at the spline fit portion and ensuring a long term prevention of the occurrence of play.

SUMMARY OF THE INVENTION

For achieving the above object, an extendable shaft according to an embodiment of the present invention comprises a first and a second shaft sections aligned on the same axis, and a clamping member for clamping the first shaft section as surrounding the first shaft section. The second shaft section includes: an outer periphery; and external splines formed on the outer periphery. The first shaft section includes: a fit hole in which the second shaft section is inserted; internal splines formed on an inner periphery of the fit hole and engaged with the external splines; an opening end via which the fit hole is opened; at least one slit extended from the opening end for a predetermined length along an axial direction of the first shaft section; a diametrically contractible portion which is elastically diametrically contractible and formed in a region ranging from the opening end to place away therefrom by the predetermined length along the axial direction of the first shaft section; and a thin-wall portion formed in a part of the diametrically contractible portion. The clamping member elastically clamps at least a part of the diametrically contractible portion of the first shaft section.

According to this embodiment, the thin-wall portion is provided so as to expedite the deformation of the diametrically contractible portion. Even though a fit portion between the internal and external splines suffers heavy wear, therefore, the diametrically contractible portion can be deformed in an amount according to the amount of wear. As a result, there may be ensured a long term prevention of the occurrence of play between the first and the second shaft sections despite the occurrence of wear.

Since the diametrically contractible portion is prone to yield, a clamping member having a low clamping force may be employed. This results in a reduced slide resistance between the first and the second shaft sections. Since the thin-wall portion is formed in a part of the diametrically contractible portion, the thin-wall portion may be formed at a lower cost as compared with a case where the whole body of the diametrically contractible portion is formed thin.

DETAILED DESCRIPTION OF THE PREFERRED EMBODIMENTS

Figure 1:
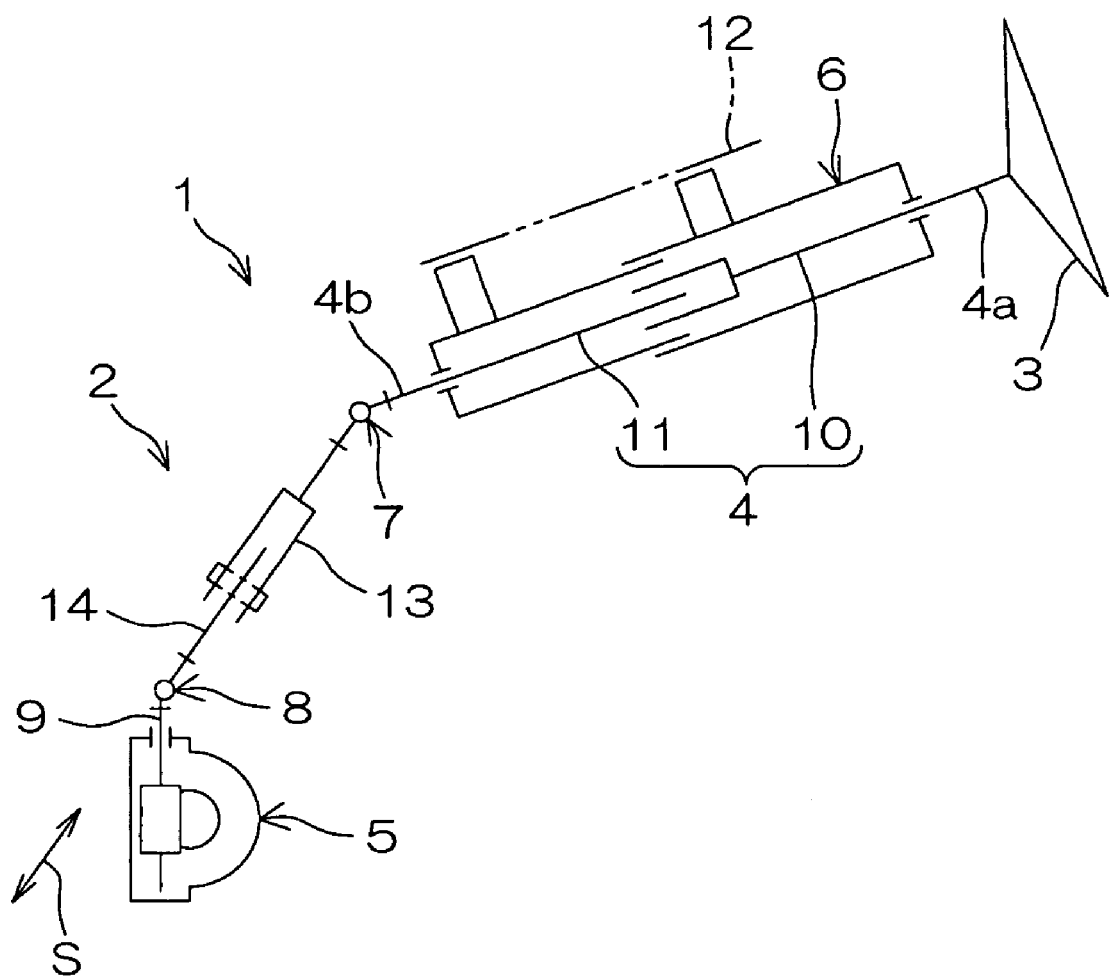
FIG. 1 is a side view schematically showing an arrangement of a vehicular steering assembly including an intermediate shaft as an extendable shaft according to one embodiment of the present invention.

An intermediate shaft as an extendable shaft according to one embodiment of the present invention will hereinbelow be described in details with reference to the accompanying drawings. FIG. 1 is a schematic diagram showing a general arrangement of a vehicular steering assembly including the aforesaid intermediate shaft.

Referring to FIG. 1, a vehicular steering assembly 1 includes an intermediate shaft 2. When a steering torque is applied to a steering wheel 3 in order to steer road wheels (not shown), the intermediate shaft 2 transmits the steering torque from a steering shaft 4 coupled to the steering wheel 3 at one end 4a thereof to a steering mechanism 5 for steering the road wheels.

The vehicular steering assembly 1 includes the aforesaid steering shaft 4 for transmitting the steering torque, and a steering column 6 rotatably supporting the steering shaft 4 pierced therethrough. An other end 4b of the steering shaft 4 is connected with a rotary shaft 9 of the aforesaid steering mechanism 5 via the intermediate shaft 2 including a first and a second universal joint 7, 8. When the steering wheel 3 is steered, the steering torque is transmitted to the steering mechanism 5 via the steering shaft 4 and the like, so that the road wheel is steered.

The steering shaft 4 includes an upper shaft 10 coupled to the steering wheel 3 at one end thereof, and a lower shaft 11. The upper shaft 10 and the lower shaft 11 are coupled to each other via spline fit such as to be movable relative to each other along an axial direction of the steering shaft 4 and to be rotated in unison.

The vehicular steering assembly 1 is arranged such that the steering column 6 is supported by a vehicle body 12 (only a part thereof is shown in the figure) in a manner to permit the adjustment of the position thereof so as to provide for positional adjustment of the steering wheel 3. The positional adjustment may sometimes involve displacement of the other end 4b of the steering shaft 4. In addition, the position of the steering mechanism 5 may be shifted during driving operations. The intermediate shaft 2 is designed free to extend or contract in order to accommodate such displacements of these components.

While the following description is made on assumption that the intermediate shaft 2 is the extendable shaft of the present invention, the extendable shaft of the present invention may be applied to the steering shaft 4, as will be described hereinafter.

The intermediate shaft 2 includes the aforesaid first universal joint 7, a first shaft section 13, a second shaft section 14 and the aforesaid universal joint 8, which are unitarily rotatably connected with each other.

Figure 2:
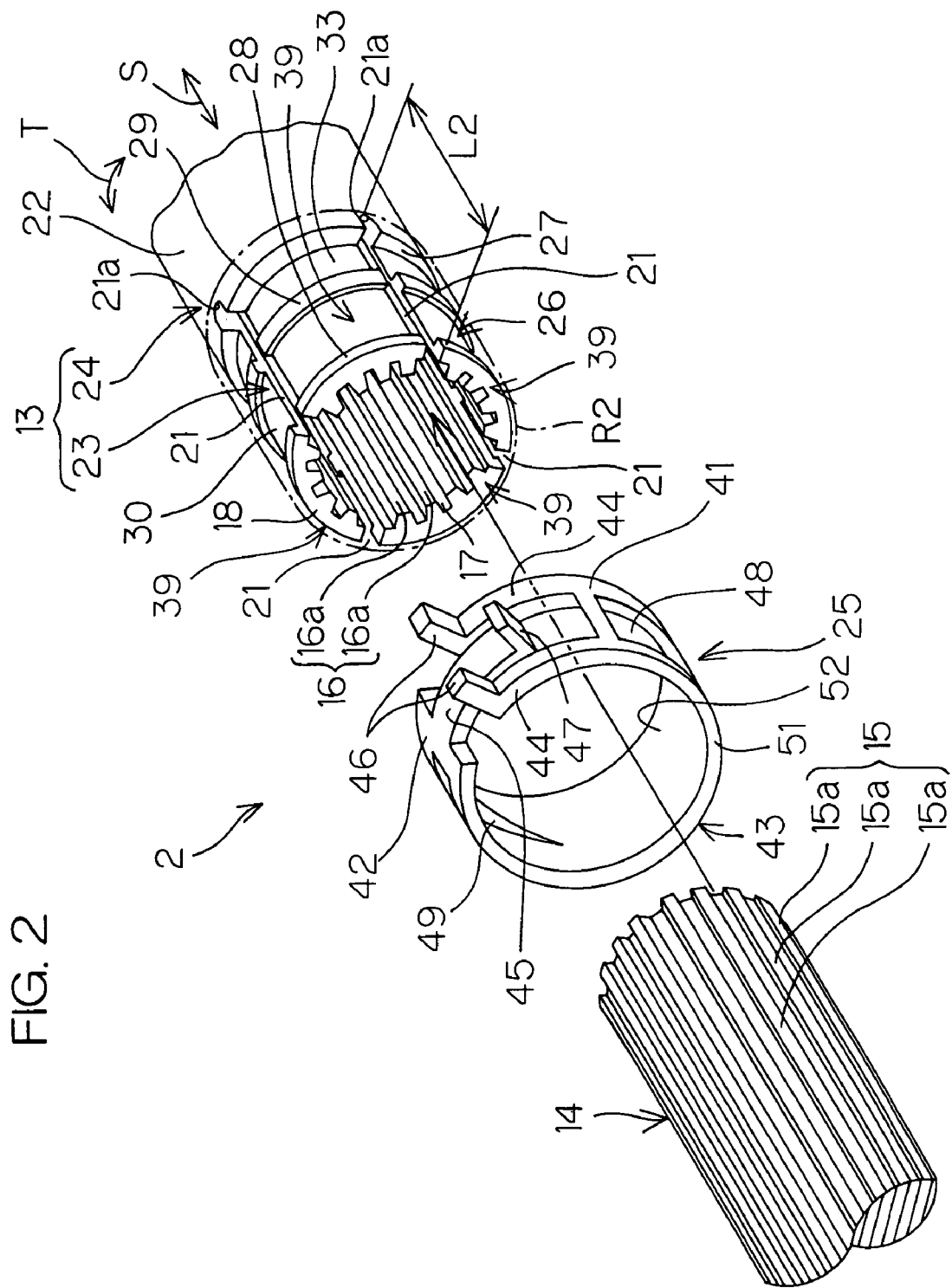
FIG. 2 is an exploded perspective view showing a principal part of the intermediate shaft shown in FIG. 1.
Figure 3A:
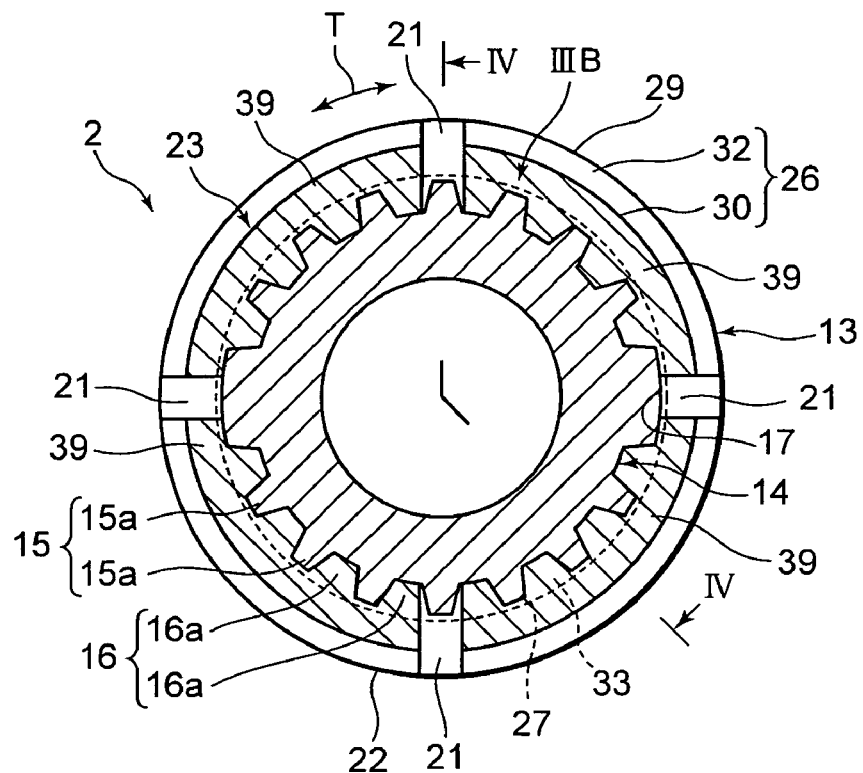
FIG. 3A is a sectional view showing a principal part of the intermediate shaft shown in FIG. 2 and equivalent to a sectional view taken on the line IIIA—IIIA in the following FIG. 4.

Referring to FIGS. 2 and 3A, the intermediate shaft 2 includes the first shaft section 13 having a tubular shape and the second shaft section 14 aligned on the same axis, and the second shaft section 14 is inserted in the first shaft section 13. These shaft sections 13, 14 are engaged with to each other via spline fit so as to be slidably movable relative to each other along the axial direction S of the intermediate shaft 2.

The second shaft section 14 comprises a hollow shaft formed of a metal member such as steel. The second shaft section 14 is formed with external splines 15 on its outer periphery, the external splines 15 extending along the axial direction S. The external splines 15 include a plurality of spline teeth 15a (only partially depicted in the figure) extended for a predetermined length along the axial direction S.

The first shaft section 13 includes internal splines 16 engaged with the external splines 15. The internal splines 16 are formed on an inner periphery 17 of the first shaft section 13. The internal splines 16 include a plurality of spline teeth 16a (only partially depicted in the figure) extended from an opening end 18 of the first shaft section 13 for a predetermined length along the axial direction S.

Figure 3B:
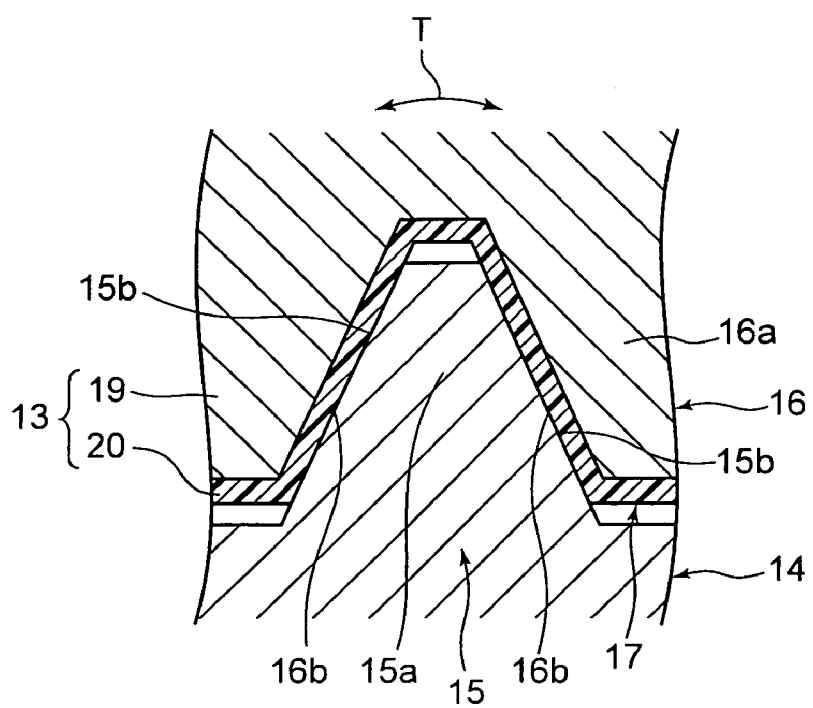
FIG. 3B is an enlarged view showing IIIB portion of FIG. 3A.
Figure 4:
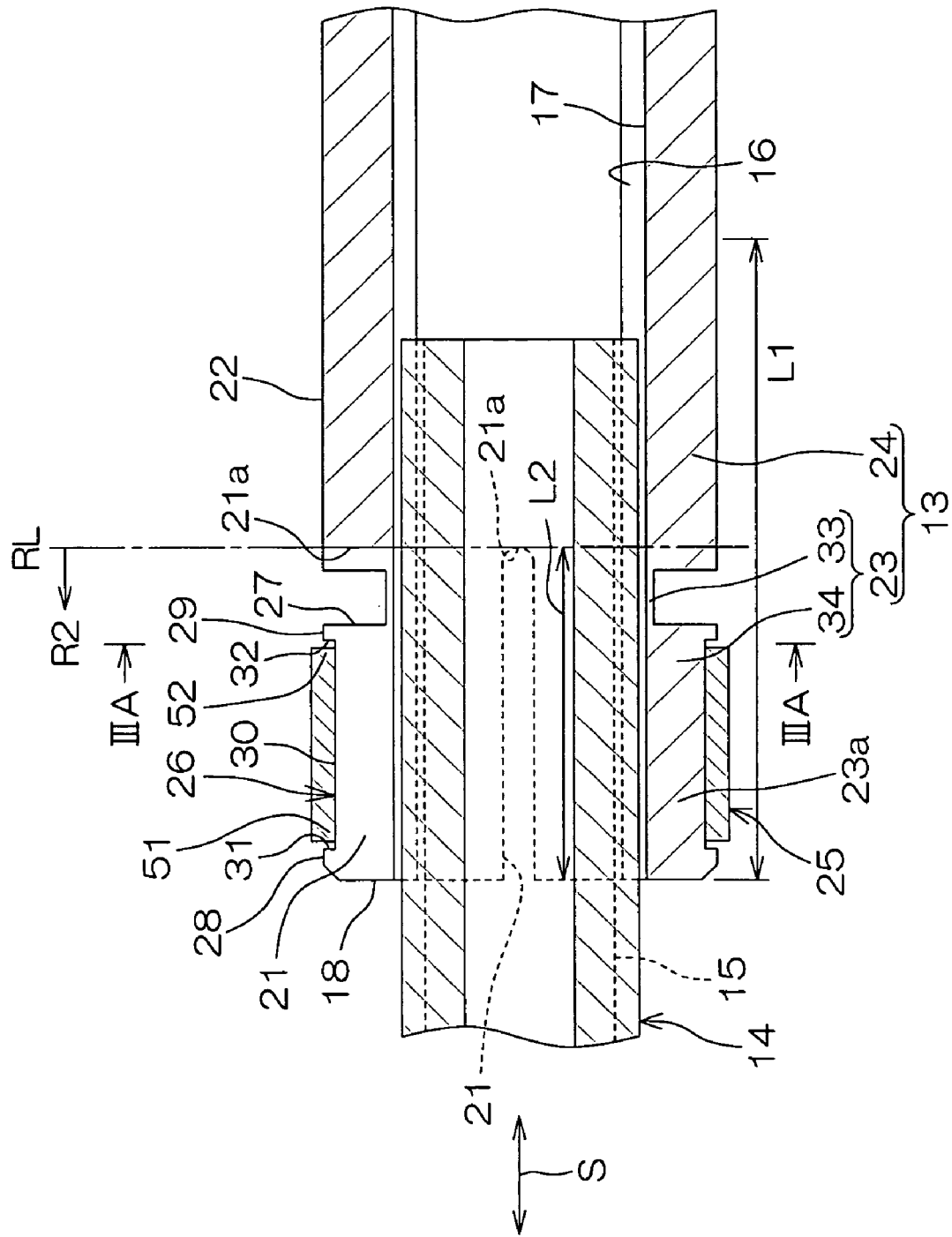
FIG. 4 is a vertical sectional view showing the principal part of the intermediate shaft shown in FIG. 2 and equivalent to a sectional view taken on the line IV—IV in FIG. 3A.

Referring to FIGS. 3B and 4, the first shaft section 13 includes a metal member 19 formed in a tubular shape, and a synthetic-resin member 20 coated on an inner periphery of the metal member 19. The metal member 19 is formed from a steel or the like defining a principal part of the first shaft section 13.

The synthetic-resin member 20 is a coating film coated over a surface of the metal member 19 as a base. The synthetic-resin member 20 continuously extends over the inner periphery 17 of the first shaft section 13 along a circumferential direction T thereof while continuously extending over a region of the inner periphery 17 of the first shaft section 13, the region having a predetermined length L1 from the opening end 18 with respect to the axial direction S. The predetermined length L1 is defined to be not less than a maximum fit length of the external splines 15 and the internal splines 16.

The synthetic-resin member 20 contains one or more types of solid lubricants including fluorine resins such as polytetrafluoroethylene (PTFE), molybdenum disulfide ($MoS_2$), fluorine compounds and the like, thus having a low friction property. Furthermore, the synthetic-resin member 20 may also contain a synthetic resin as a binder.

Referring to FIGS. 2 and 3A, the first shaft section 13 includes a tubular main body 24, and a diametrically contractible portion 23 adapted to be elastically contracted in diameter. The elastically contractible portion 23 comprises a plurality of elastic pieces 39 extended from the main body 24 and shaped like an arc in section.

Specifically, the first shaft section 13 is formed with a plurality of slits 21 extended from the opening end 18 of the first shaft section 13 for a predetermined length L2 along the axial direction S. The plural slits 21 are arranged with equal spacing along the circumferential direction T of the first shaft section 13. Adjoining elastic pieces 39 are divided by the slits 21. The slits 21 open towards the opening end 18, inner periphery 17 and outer periphery 22 of the first shaft section 13.

A region R2 of the first shaft section 13 which extends for the aforesaid predetermined length L2 from the opening end 18 operates as the aforesaid diametrically contractible portion 23 by virtue of the effect of the slits 21. As seen in FIG. 4, the region R2 ranges between a phantom plane RL and the opening end 18 (the left-side area as seen in FIG. 4), the phantom plane including slit ends 21a of the slits 21 and extending perpendicularly to the axial direction.

Referring to FIGS. 2 and 4, the intermediate shaft 2 includes a clamping member 25 for elastically clamping the diametrically contractible portion 23 as surrounding a periphery of the diametrically contractible portion 23 of the first shaft section 13. The clamping member 25 is formed from an elastic member such as a spring steel.

The clamping member 25 includes an arcuate main body 43 having a first and a second ends 41, 42 with respect to the circumferential direction; a pair of first extension pieces 44 extended from the first end 41 of the main body 43 along the circumferential direction; and a second extension piece 45 extended from the second end 42 of the main body 43 along the circumferential direction so as to enter a space between the pair of first extension pieces 44, 44.

The first and the second extension pieces 44, 45 are formed in smaller widths than the main body 43. The pair of first extension pieces 44 are each formed with a first manipulation portion 46 at a distal end thereof, the first manipulation portion 46 bent radially outwardly at right angles. A second manipulation portion 47 is formed at a distal end of the second extension portion 45. The clamping member 25 is adapted to be elastically expanded in diameter by applying a force to the first and the second manipulation portions 46, 47 in a direction to bring the first and the second manipulation portions 46, 47 close to each other.

The first and the second ends 41, 42 of the main body 43 are formed with a first and a second elongate holes 48, 49, respectively, for equalizing a clamping load of the clamping member 25 along the circumferential direction. The width of the first elongate hole 48 is progressively increased toward the first end 41 of the main body 43. Similarly, the width of the second elongate hole 49 is also progressively increased toward the second end 42 of the main body 43. The first and the second elongate holes 48, 49 have, for example, a triangular shape.

An outer periphery of the diametrically contractible portion 23 includes: a first groove 26 closely spaced from the opening end 18 and extended along the circumferential direction T; a second groove 27 closely spaced from the slit ends 21a of the slits 21 and extended along the circumferential direction T; a first great diameter portion 28 formed between the opening end 18 and the first groove 26; and a second great diameter portion 29 formed between the first groove 26 and the second groove 27. An outside diameter of the second great diameter portion 29 is equal to that of the main body 24, but is greater than that of the first great diameter portion 28. The first groove 26 is located closer to the opening end 18 than the second groove 27 is.

The first groove 26 includes a fit portion 30 defined by a groove bottom fitted with the clamping member 25, and step portions 31, 32 defining a pair of edges in opposing relation with respect to the axial direction S. These step portions 31, 32 function as position control portions which abut against a first and a second edges 51, 52 of the clamping member 25, thereby inhibiting the movement of the clamping member 25 relative to the first shaft section 13. Thus, the step portions 31, 32 prevent the clamping member 25 from being disengaged or displaced from the first shaft section 13. An outside diameter of the fit portion 30 in a free state is greater than an inside diameter of the clamping member 25 in a free state.

According to this embodiment, the diametrically contractible portion 23 includes a thin-wall portion 33 as a part thereof such that the diametrically contractible portion may be prone to yielding when clamped by the clamping member 25. In addition, the diametrically contractible portion 23 includes a thick-wall portion 34 as a part thereof which has a greater thickness than the thin-wall portion 33. The thick-wall portion 34 and the thin-wall portion 33 are aligned along the axial direction S. The thick-wall portion 34 is located between the thin-wall portion 33 and the opening end 18.

The first groove 26 includes a fit portion 30 defined by a groove bottom fitted with the clamping member 25, and step portions 31, 32 defining a pair of edges in opposing relation with respect to the axial direction S. These step portions 31, 32 function as position control portions which abut against a first and a second edge 51, 52 of the clamping member 25, thereby inhibiting the movement of the clamping member 25 relative to the first shaft section 13. Thus, the step portions 31, 32 prevent the clamping member 25 from being disengaged or displaced from the first shaft section 13. An outside diameter of the fit portion 30 in a free state is greater than an inside diameter of the clamping member 25 in a free state.

The thin-wall portion 33 is thinner than the main body 24 of the first shaft section 13 and than a portion 23a defining the fit portion 30 of the diametrically contractible portion 23. The thin-wall portion 33 has a smaller outside diameter than that of the main body 24 of the first shaft section 13 and that of the fit portion 30. A sectional shape of the thin-wall portion 33 has a constant thickness in a region corresponding to the width of the second groove 27 with respect to the axial direction S.

The fit portion 30 and the clamping member 25 are located at place shifted from the thin-wall portion 33 and the second groove 27 toward the opening end 18.

Figure 5A:
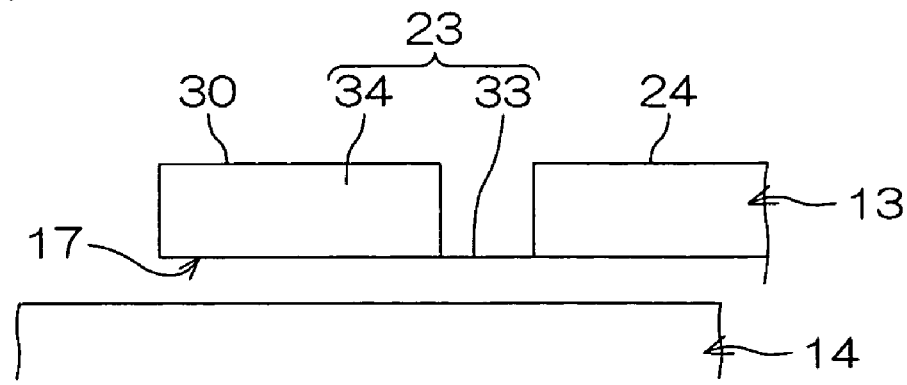
FIGS. 5A and 5B are schematic diagrams each showing step of an assembly process of the intermediate shaft, FIG. 5A showing a state before a clamping member is mounted, FIG. 5B showing a state after the clamping member is mounted.
Figure 6A:
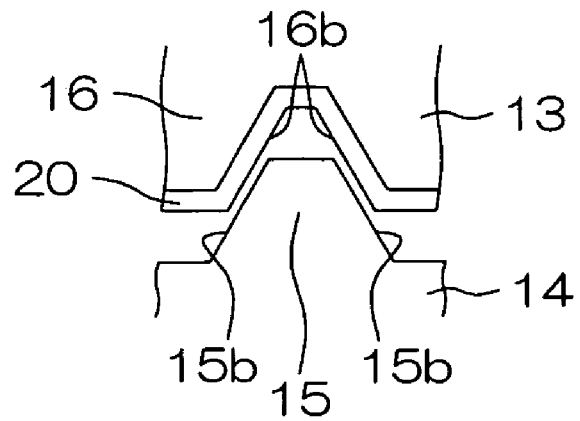
FIGS. 6A, 6B and 6C are schematic diagrams corresponding to FIGS. 5A, 5B and 5C, respectively, for illustrating a respective spline fit state of spline teeth.

FIGS. 5A and 6A show one step of an assembly process of the intermediate shaft 2, wherein the second shaft section 14 and the first shaft section 13 are fitted with each other but the clamping member 25 is not yet mounted on the fit portion 30. In this state, the diametrically contractible portion 23 and main body 24 of the first shaft section 13 are fitted on the second shaft section 14 with some play with respect to the circumferential direction T and a radial direction. Accordingly, there is formed a clearance between tooth faces 15b, 16b of the external splines 15 and the internal splines 16 as shown in FIG. 6A.

Figure 5B:
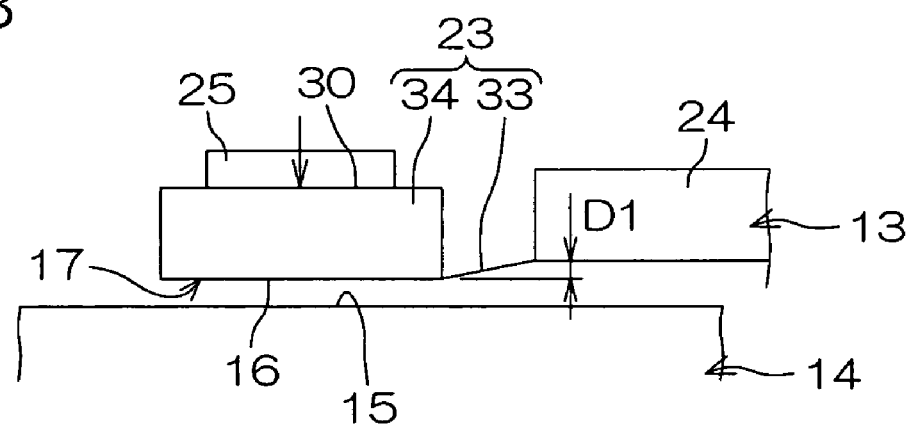
Figure 6B:
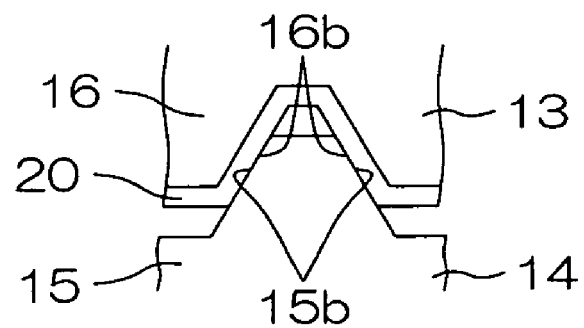

Next, FIGS. 5B and 6B show a state where the clamping member 25 is mounted on the fit portion 30. In this state, a force applied from the clamping member 25 produces yielding deformation mainly at the thin-wall portion 33 so that the diametrically contractible portion 23 is contracted in diameter. This brings the tooth faces 15b, 16b of the external splines 15 and internal splines 16 into mutual abutment, so that the external splines 15 and the internal splines 16 are meshed with each other without play.

Figure 5C:
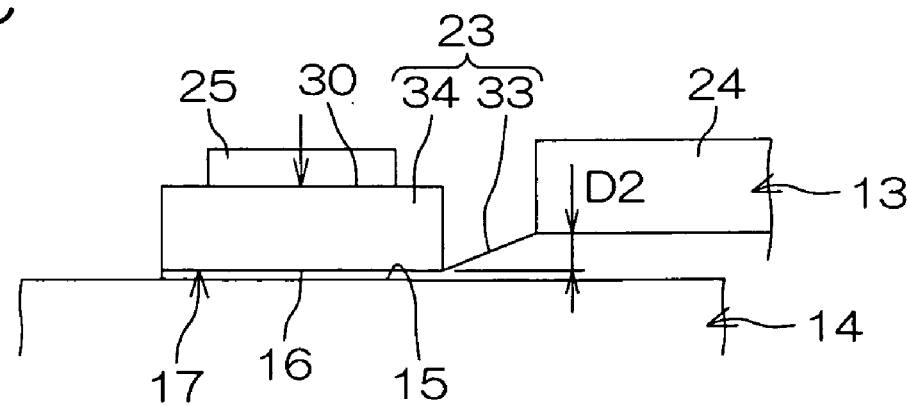
FIG. 5C is a schematic diagram showing the intermediate shaft encountering a long term change after assembly.
Figure 6C:
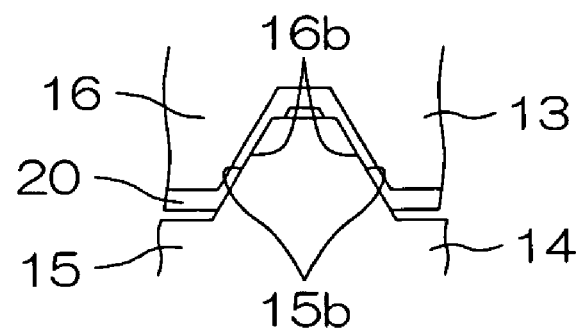

FIGS. 5C and 6C show a state where a long term change has occurred at a spline fit portion due to use over an extended period of time. The secular change involves, for example, the decrease of the thickness of the synthetic-resin member 20 over the tooth faces 16b of the internal splines 16. Hence, the synthetic-resin member 20 may suffer permanent set. Despite the occurrence of the permanent set, the thin-wall portion 33 is deformed more in accordance with the decrease of the thickness of the synthetic-resin member. Accordingly, the amount of yielding of the diametrically contractible portion 23 is increased from a value D1 at the completion of assembly (see FIG. 5B) to a value D2 (D2>D1) and hence, the inside diameter of the diametrically contractible portion 23 is reduced from a value at the completion of assembly. As a result, the play-free meshing relation between the external splines 15 and the internal splines 16 is retained.

During the transmission of a small torque, the diametrically contractible portion 23 of the first shaft section 13 is meshed with the second shaft section 14 without play. During the transmission of a great torque, the diametrically contractible portion 23 and the main body 24 of the first shaft section 13 are meshed with the second shaft section 14 without play.

According to the embodiment of the present invention, the thin-wall portion 33 expedites the yielding of the diametrically contractible portion 23. Therefore, if the synthetic-resin member 20 should encounter heavy permanent set or wear, as shown in FIGS. 5B and 5C, the diametrically contractible portion 23 will be contracted in diameter according to a varied amount of permanent set or wear. This leads to an effect to prevent the occurrence of play over an extended period of time.

Furthermore, the clamping member 25 for attaining this effect may be a clamping member which provides a low clamping force when initially assembled. This contributes to the reduction of slide resistance at the spline fit portion.

The embodiment is adapted to reduce the slide resistance in this manner, so that the permanent set or wear at the spline fit portion may be impeded. This results in a long term prevention of the occurrence of play.

Since the thin-wall portion 33 is locally provided, the thin-wall portion 33 may be formed more easily by machining, for example, as compared with a case where the whole body of the diametrically contractible portion 23 is formed thin. In addition, the thickness of the thin-wall portion 33 may be decreased even further. This results in an even more yieldable diametrically contractible portion 23. Furthermore, the thin-wall portion 33 may be formed at a lower cost.

In a case where the clamping member is designed to have a greater clamping force, the clamping member 25 tends to be increased in size. Hence, the clamping member to be disposed in a limited space suffers a lower degree of freedom of design.

In contrast, this embodiment permits the clamping force of the clamping member 25 to be decreased thereby attaining a higher degree of freedom of designing the clamping member 25. It is therefore easy to control a relation between the amount of deformation and the clamping force of the clamping member 25. For instance, the clamping member 25 may be designed such that the clamping force is varied less based on a predetermined amount of deformation of the clamping member. Thus, the clamping member may not be varied much in the clamping force between when the clamping member is put to use and when the clamping member has a great amount of wear or the like due to use over an extended period of time.

In an alternative arrangement, the clamping force of the clamping member 25 may be reduced even further by specifying substantially the same length of period as that of the prior art, the period during which the occurrence of play may be obviated although the wear or permanent set is encountered.

Referring to FIG. 4, a required length of the slit 21 for providing a predetermined amount of yielding of the diametrically contractible portion 23 may also be decreased by virtue of the provision of the thin-wall portion 33. This also leads to an increased fit length of the main body 24 of the first shaft section 13 and a corresponding portion of the second shaft section 14 as the intermediate shaft 2 has a constant length with respect to the axial direction S. As a result, the spline teeth may be increased in torsional strength such that the maximum torque transmittable between the main body 24 and the second shaft section 14 may be increased.

Although the slit 21 may be formed singly, it is advantageous to form a plurality of slits 21 from the standpoint of making the diametrically contractible portion 23 more yieldable.

The thin-wall portion 33 may be formed at a lower cost by forming the second groove 27 in the diametrically contractible portion 23 along the circumferential direction T thereof.

The clamping member 25 is disposed closer to the opening end 18 than the thin-wall portion 33 is, whereby a bending moment associated with the clamping force of the clamping member 25 may be increased. This results in an effective yielding of the diametrically contractible portion 23 such that the amount of yielding may be increased even further, for example. This is advantageous in further extending the period ensuring the prevention of the occurrence of play or further reducing the slide resistance. It is more preferred to increase a distance between the clamping member 25 and the thin-wall portion 33.

Referring to FIGS. 3B and 4, the synthetic-resin member 20 forms at least a part of the tooth face 16b of the internal spline 16, thereby preventing contact between the metal members of the first shaft section 13 and the second shaft section 14. Hence, the occurrence of noises due to the contact between the metal members may be prevented. In a case where the synthetic-resin member 20 has the low friction property, the slide resistance may be decreased even further.

The synthetic-resin member 20 forms only a part of the inner periphery 17 of the first shaft section 13, or more preferably forms only a part of the spline tooth 16a. This results in a reduced usage of a low-friction synthetic resin material forming the synthetic-resin member 20 as compared with a case where the overall inner periphery 17 of the first shaft section 13 is formed from the low-friction synthetic resin, which is normally expensive. Accordingly, the first shaft section 13 may be formed at a lower cost. Furthermore, the synthetic-resin member 20 is concentrated on the aforesaid region of the predetermined length L1 which contributes to the reduction of the slide resistance and to the elimination of play, whereby the slide resistance is more effectively reduced by using a smaller amount of synthetic-resin member 20.

Figure 7:
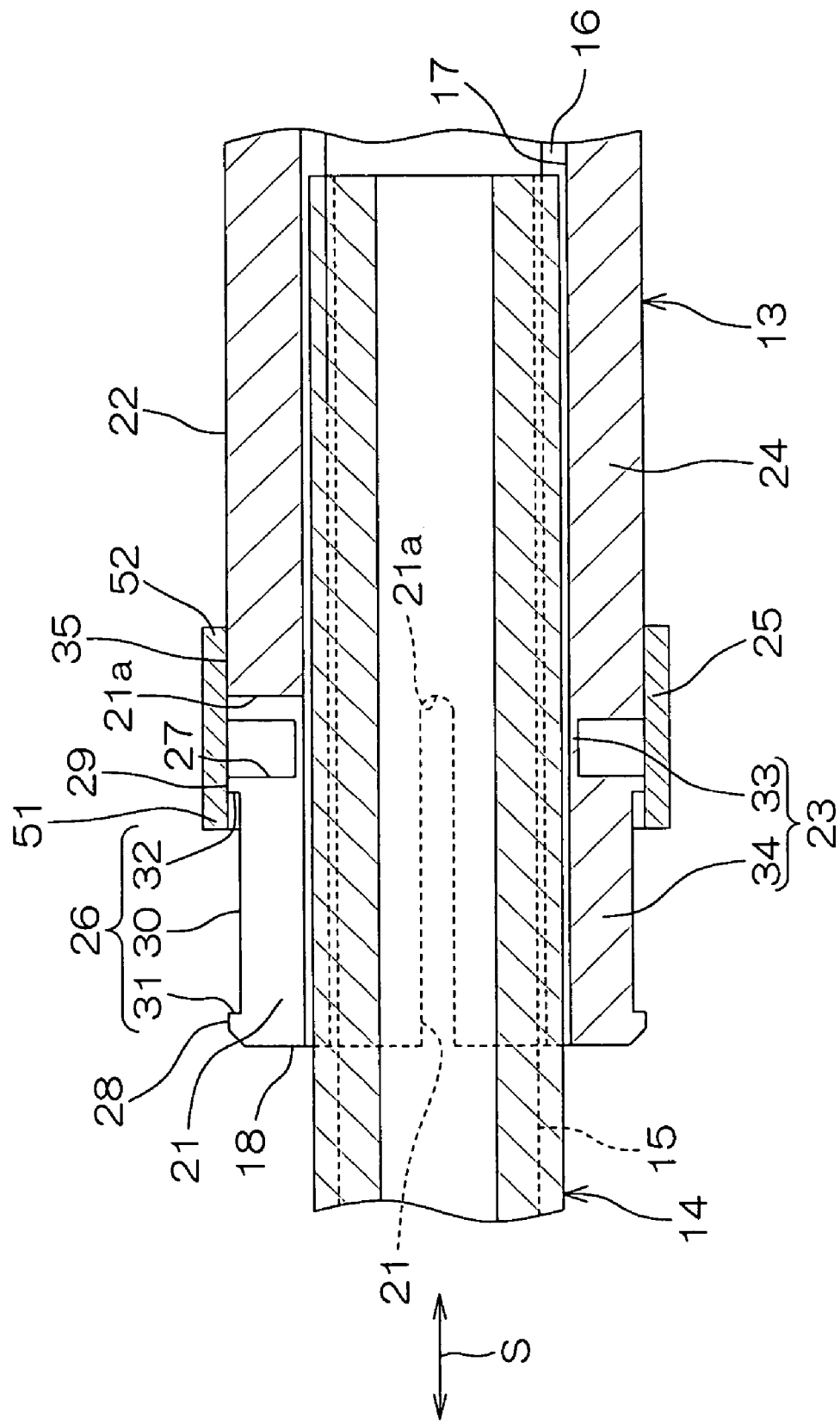
FIG. 7 is a sectional view of the intermediate shaft for illustrating how the clamping member is temporarily retained before mounted to a fit portion during the assembly process of the intermediate shaft.

FIG. 7 shows a state where the clamping member 25 to be mounted on the fit portion 30 is temporarily retained by a temporary retaining portion 35 of the first shaft section 13. That is, the outer periphery of the main body 24 of the first shaft section 13 includes the temporary retaining portion 35 at place close to the diametrically contractible portion 23, the temporary retaining portion 35 on which at least a part of the clamping member 25 to be fitted on the fit portion 30 may be temporarily retained during assembly. The temporary retaining portion 35 has a greater diameter than the fit portion 30.

The temporary retaining portion 35 is provided at the main body 24 having no slits 21 and thence having a high rigidity, the main body 24 adjoining the slit ends 21a of the slits 21. An outside diameter of the temporary retaining portion 35 is equal to or somewhat greater than the outside diameter of the second great diameter portion 29.

The clamping member 25 temporarily retained by the temporary retaining portion 35 of the main body 24 is placed in a manner to cover the second groove 27, such that the first edge 51 of the clamping member 25 rests lightly on the second great diameter portion 29 serving as an auxiliary temporary retaining portion. The rigid temporary retaining portion 35 of the main body 24 prevents the clamping member 25 from being reduced in its diameter and hence, little clamping force is applied to the great diameter portion 29 of the diametrically contractible portion 23.

Since the clamping member 25 temporarily retained by the temporary retaining portion 35 is prevented from applying the clamping force to the diametrically contractible portion 23, the slide resistance at the spline fit portion may be reduced while the clamping member 25 is temporarily retained. This permits the intermediate shaft 2 to be expanded or contracted by, for example, manual operations and hence, the intermediate shaft 2 may be readily assembled to the vehicle body.

Referring to FIG. 1, the intermediate shaft 2 is assembled to the vehicle body in the following manner, for example. The first universal joint 7 at one end of the intermediate shaft 2 is coupled to the end 4b of the steering shaft 4 so as to control the position of the intermediate shaft 2. In this state, the intermediate shaft 2 is first contracted and then extended so as to couple the universal joint 8 at the other end thereof to the rotary shaft 9 of the steering mechanism 5.

When the intermediate shaft 2 is contracted and extended in the aforementioned manner, the clamping member 25 is previously retained on the temporary retaining portion 35 as shown in FIG. 7. This permits the intermediate shaft 2 to be readily contracted and extended so that the second universal joint 8 thereof may be readily connected with the rotary shaft 9. After the intermediate shaft 25 is connected, the clamping member 25 is moved from the temporary retaining portion 35 to the fit portion 30 so as to be mounted on the fit portion 30.

In the temporarily retained state, the first edge 51 of the clamping member 25 rests on the second great diameter portion 29 and hence, the temporarily retained clamping member 25 may be moved to the fit portion 30 without being caught on the edge of the second groove 27. The clamping member 25 may only be increased in diameter a little, for example, thereby to be smoothly slidably moved to the fit portion 30.

Figure 8:
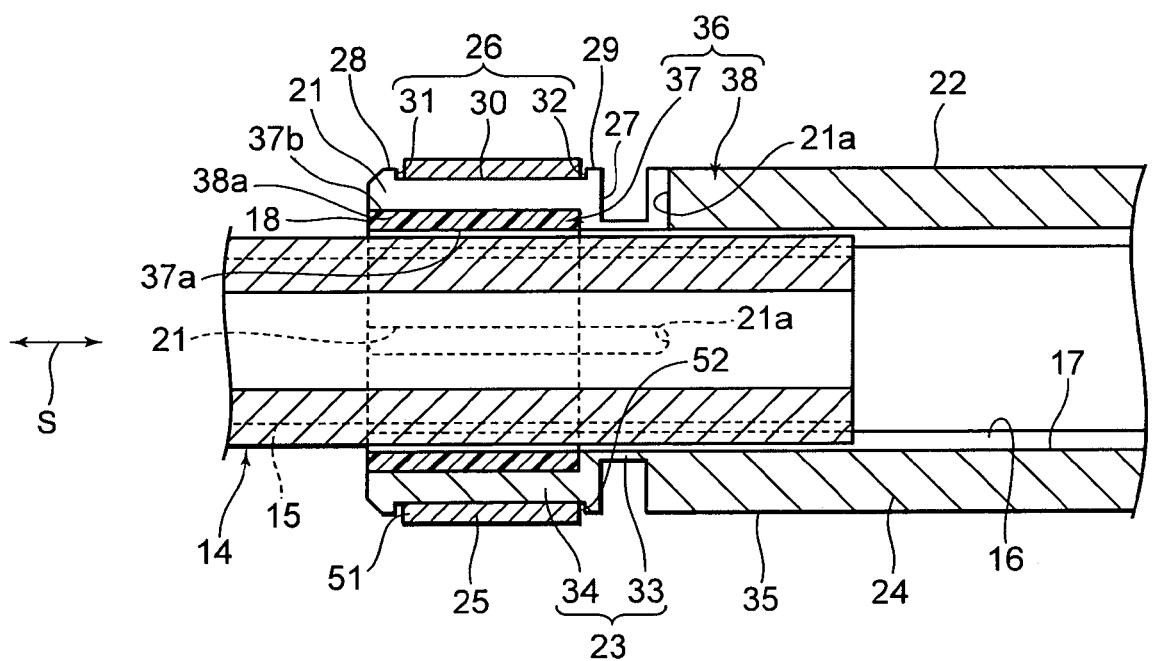
FIG. 8 is a sectional view showing a principal part of an intermediate shaft as an extendable shaft according to another embodiment of the present invention.

Next, another embodiment is described with reference to FIG. 8. This embodiment principally differs from the embodiment of FIG. 4 in that a second shaft section 36 is used in place of the first shaft section 13. The description on this embodiment focuses on the difference from the foregoing embodiment while like components are represented by the same reference characters, respectively, the description of which is dispensed with.

According to this embodiment, the second shaft section 36 includes a synthetic-resin member 37 having a tubular shape, and a metal member 38 to which the synthetic-resin member 37 is fixed. The metal member 38 includes a coaxial retaining hole 38a formed in its inner periphery and at place near the opening end 18. The metal member 38 retains the synthetic-resin member 37 fitted in the retaining hole 38a.

An inner periphery 37a of the synthetic-resin member 37 is formed with the internal splines 16, whereas an outer periphery 37b of the synthetic-resin member 37 is formed in a cylindrical surface. An axial length of the synthetic-resin member 37 is defined to be substantially equal to a length between the opening end 18 and the second great diameter portion 29.

According to this embodiment, the synthetic-resin member 37 itself is formed with the internal splines 16 thereby negating the need for working the splines in the hard metal member. Therefore, the production cost may be reduced.

Figure 9:
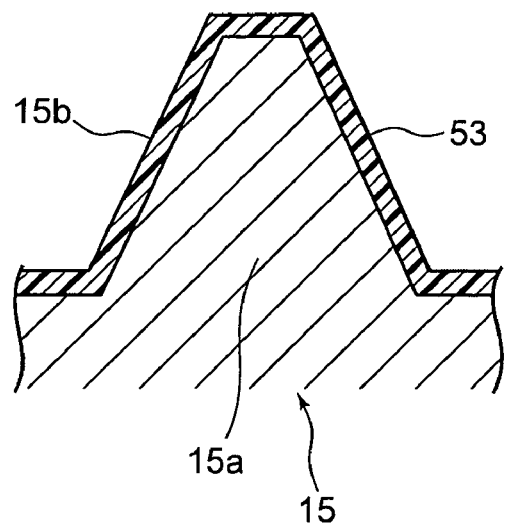
FIG. 9 is an enlarged sectional view showing a principal part of an extendable shaft according to yet another embodiment of the present invention.
Figure 10:
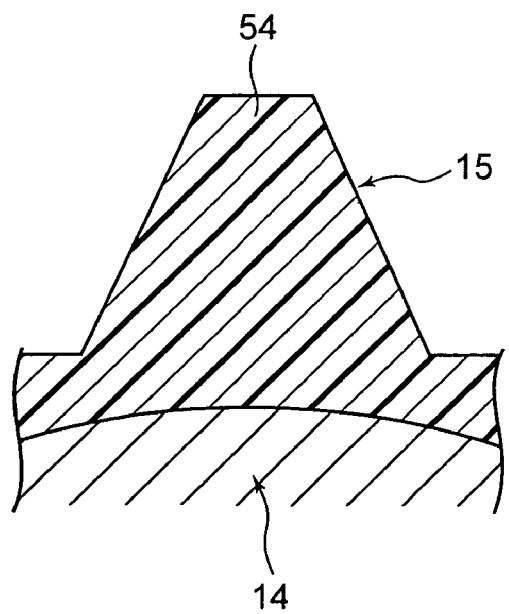
FIG. 10 is an enlarged sectional view showing a principal part of an extendable shaft according to yet another embodiment of the present invention.

Instead of the synthetic-resin member 20, 37 for forming the internal splines 16, a synthetic-resin member 53 of a coating resin may be provided for forming the external splines 15, as shown in FIG. 9. Alternatively, a cylindrical synthetic-resin member 54 forming the external splines 15 may be provided and fixed to the metal member, as shown in FIG. 10. These arrangements also afford the effects to reduce the noises, slide resistance and the like.

Furthermore, the synthetic-resin member 53 or 54 for forming the external splines 15 and the synthetic-resin member 20 or 37 for forming the internal splines 16 may be used in combination.

Otherwise, the synthetic-resin members 20, 37, 53, 54 may be dispensed with while the spline teeth 15a, 16a of these splines may be formed from a metal member. In this case, the long term prevention of play and the reduction of slide resistance may be achieved despite the increase in wear of the metal members.

Figure 11:
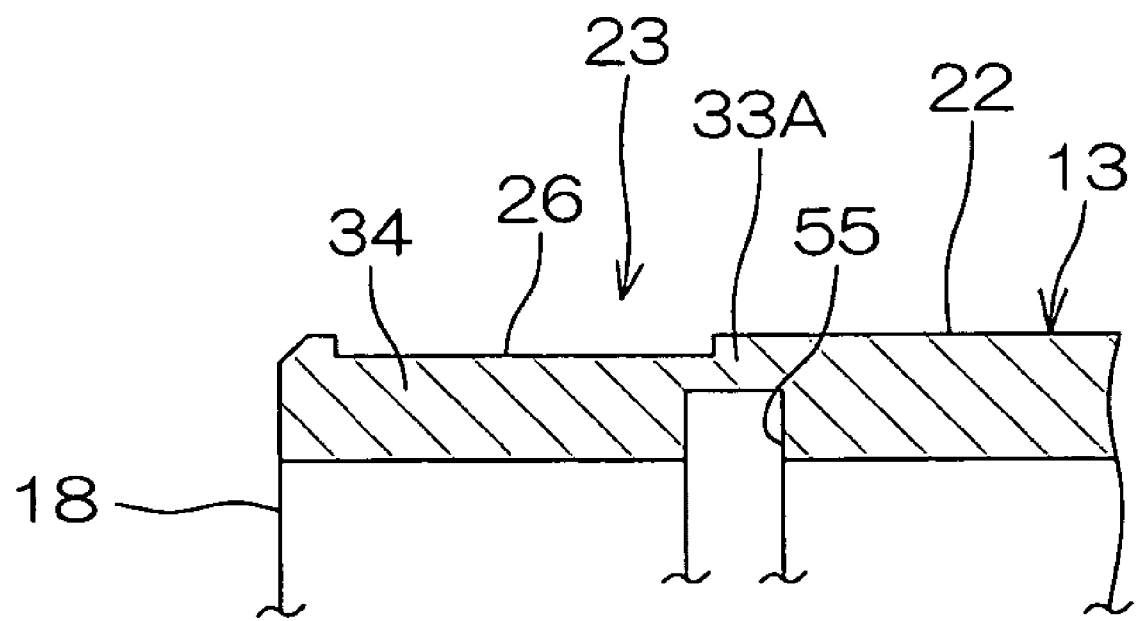
FIG. 11 is a schematic sectional view showing a principal part of an extendable shaft according to yet another embodiment of the present invention.

As shown in FIG. 11, a thin-wall portion 33A may be formed by forming a groove 55 in the inner periphery 17 of the first shaft section 13. In this case, at least a part of the groove 55 may be located radially inwardly of the second groove 26 or may not.

In the course of the assembly, the clamping member 25 may be retained by the temporary retaining portion 35 on its overall inner periphery so that the clamping member 25 may not cover the second groove 27.

A small distance may be provided between the temporary retaining portion 35 and the diametrically contractible portion 23. In this case, as well, it is preferred that the diametrically contractible portion 23 is as close as possible to the temporary retaining portion 35.

In an alternative arrangement not shown, the second great diameter portion 29 may be dispensed with while a part of the clamping member 25 mounted on the fit portion 30 may project over the second groove 27.

The above clamping member 25 may have a C-shaped configuration free from a circumferentially overlapped portion.

As mentioned supra, the extendable shaft of the present invention may be applied to the steering shaft 4, while the steering shaft 4 may have the same configuration as the intermediate shaft 2. In this case, an end of the upper shaft 11 as the second shaft section is configured in the same way as the end of the first shaft section 13, whereas an end of the lower shaft 12 as the first shaft section is configured in the same way as the end of the second shaft section 14.

While the present invention has been described in details by way of reference to the specific embodiments thereof, variations, modifications and equivalents thereto will readily occur to those skilled in the art who have fully understood the contents of the foregoing description. The scope of the present invention is therefore to be defined by the appended claims and the equivalents thereto.

The present application is in correspondence to Japanese Patent Application No.2003-200689 filed with Japanese Patent Office on Jul. 23, 2003, and the whole disclosure thereof is incorporated herein by reference.

What is claimed is:

1. An extendable shaft comprising:
   a first and a second shaft section aligned on a same axis; and
   a clamping member for clamping the first shaft section as surrounding the first shaft section, the clamping member having a substantially circular shape, and having a pair of end portions in a circumferential direction, and being elastically diametrically expandable,
   the second shaft section including: an outer periphery, and external splines formed on the outer periphery,
   the first shaft section including:
      a fit hole in which the second shaft section is inserted;
      internal splines formed on an inner periphery of the fit hole and engaged with the external splines;
      an open end via which the fit hole is opened;
      at least one slit extended from the open end for a predetermined length along an axial direction of the first shaft section;
      a diametrically contractible portion which is elastically contractible and formed in a region ranging from the open end to a place away from the open end by the predetermined length along the axial direction of the first shaft section; and the diametrically contractible portion comprising at least a first portion and a second portion along a length thereof, the first portion having a wall thickness that is less than a wall thickness of the second portion, the clamping member elastically clamping at least a part of the diametrically contractible portion of the first shaft section due to its elastic resilient force.

2. The extendable shaft according to claim 1,
wherein the diametrically contractible portion includes a portion located between the thin-wall portion and the open end, and
wherein at least a part of the clamping member clamps the portion located between the thin-wall portion and the open end.

3. The extendable shaft according to claim 1,
wherein the first shaft section includes a groove extended in a circumferential direction of the first shaft section, and
wherein the first portion includes a portion defining a bottom of the groove of the first shaft section.

4. The extendable shaft according to claim 3, wherein the groove includes a groove formed in an outer periphery of the first shaft section.

5. The extendable shaft according to claim 3, wherein the groove includes a groove formed in an inner periphery of the fit hole of the first shaft section.

6. The extendable shaft according to claim 3,
wherein the diametrically contractible portion includes a portion located between the groove and the open end, and
wherein at least a part of the clamping member clamps the portion located between the groove and the open end.

7. The extendable shaft according to claim 1, further comprising a synthetic-resin member forming at least a part of a tooth face of a tooth of at least either one of the external splines and the internal splines.

8. The extendable shaft according to claim 1,
wherein the diametrically contractible portion of the first shaft section includes a fit portion on which the clamping member is fitted,
wherein an outer periphery of the first shaft section includes a temporary retaining portion for temporarily retaining the clamping member in a manner to hold the clamping member out of fitting relation with the fit portion, and
wherein an outside diameter of the temporary retaining portion is greater than an outside diameter of the fit portion.

9. The extendable shaft according to claim 8, wherein a temporary retaining portion is engaged in an inner circumference of the clamping member for temporary retention.

10. The extendable shaft according, to claim 1,
wherein the diametrically contractible portion of the first shaft section includes a fit portion on which the clamping member is fitted, and
the diametrically contractible portion of the first shaft section includes a groove extended along a circumferential direction of the first shaft section whereas the fit portion is defined by a bottom of the groove.

11. The extendable shaft according to claim 1,
wherein a plural number of slits are provided,
wherein the first shaft section includes: a tubular main body; and a plurality of elastic pieces extended from the main body and divided by the slits, and
wherein the diametrically contractible portion is defined by the plural elastic pieces.

12. The extendable shaft according to claim 1, wherein the clamping member further comprises:
a substantially circular main body comprising the said end portions;
a first extension piece that extends in the circumferential direction from a first one of the end portions; and
a second extension piece that extends in the circumferential direction from a second one of the end portions.

13. The extendable shaft according to claim 12, wherein the clamping member further comprises:
a first manipulation portion extending from a tip of the first extension piece in a bent shape; and
a second manipulation portion extending from a tip of the second extension piece in a bent shape.

14. The extendable shaft according to claim 1, wherein the clamping member further comprises:
a substantially circular main body comprising the said end portions;
a pair of first extension pieces that extend in the circumferential direction from a first one of the end portions; and
a second extension piece that extends in the circumferential direction from a second one of the end portions and is entered into a space between the pair of first extension pieces.

15. The extendable shaft according to claim 1, wherein the clamping member further comprises:
a substantially circular main body having at least one elongate hole therein in the circumferential direction to equalize a clamping load of the clamping member.

* * * * *